United States Patent [19]
Moriya

[11] Patent Number: 5,119,310
[45] Date of Patent: Jun. 2, 1992

[54] DEVICE FOR MEASUREMENT OF WORKPIECE DIMENSIONS AND CONFORMING AUTOMATIC ADJUSTMENT OF BANDSAW BLADE GUIDE

[75] Inventor: Kikuo Moriya, Machida, Japan

[73] Assignee: Amada Company, Limited, Japan

[21] Appl. No.: 596,948

[22] Filed: Oct. 15, 1990

Related U.S. Application Data

[62] Division of Ser. No. 352,889, May 17, 1989, abandoned.

[30] Foreign Application Priority Data

May 17, 1988 [JP] Japan .................. 63-120052
Jun. 2, 1988 [JP] Japan .................. 63-134470

[51] Int. Cl.⁵ .................. B23D 55/08; B23B 13/10; G05B 19/19
[52] U.S. Cl. .................. 364/474.34; 364/474.19; 83/71; 83/13
[58] Field of Search .................. 364/474.34, 474.19, 364/474.2; 83/13, 72, 277, 364, 365

[56] References Cited
U.S. PATENT DOCUMENTS

| | | | |
|---|---|---|---|
| 4,073,247 | 2/1978 | Cunningham et al. | 364/474.34 |
| 4,363,254 | 12/1982 | Aizawa et al. | 83/820 |
| 4,371,941 | 2/1983 | Gordiski et al. | 364/474.34 |
| 4,432,260 | 7/1984 | Sarurai et al. | 83/800 |
| 4,451,892 | 5/1984 | McMurty | 364/474.34 |
| 4,644,832 | 2/1987 | Smith | 364/474.02 |
| 4,748,570 | 5/1988 | Shochi et al. | 364/474.34 |
| 4,805,500 | 2/1989 | Saito et al. | 83/800 |

Primary Examiner—Jerry Smith
Assistant Examiner—Patrick Muir
Attorney, Agent, or Firm—Wigman & Cohen

[57] ABSTRACT

A device for estimating the cross sectional shape of a workpiece and measuring its dimensions by detecting the width of the workpiece, the contact angle or the contact position when the saw blade contacts the workpiece, and the presence or absence of a workpiece vertical side surface. In addition, if the cross sectional shape and dimensions of the workpiece are already known, the positional relationship of the band saw blade and the workpiece can be calculated by detecting the position of the band saw blade. The positional relationship of the workpiece and the saw blade guides can be calculated so that the saw blade guides are controlled to maintain a position in which they do not obstruct the workpiece.

2 Claims, 7 Drawing Sheets

FIG.4

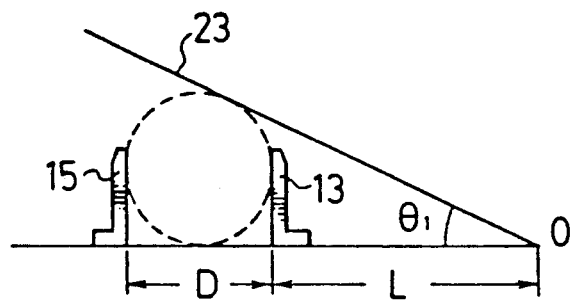

ROUND WORKPIECE $$\theta = 2\tan^{-1}\frac{D}{2L+D} \quad ---(1)$$

DIAMETER D

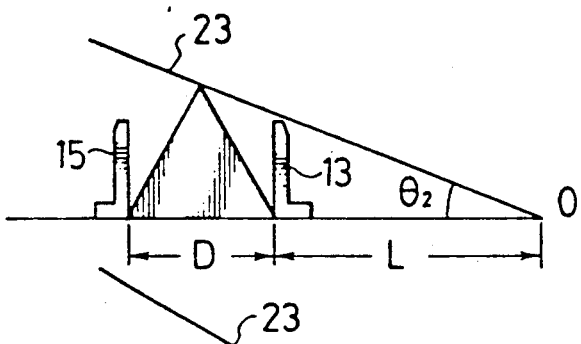

TRIANGULAR WORKPIECE $$\theta = \tan^{-1}\frac{\sqrt{3}D}{2L+D} \quad ---(2)$$

LENGTH OF ONE SIDE D

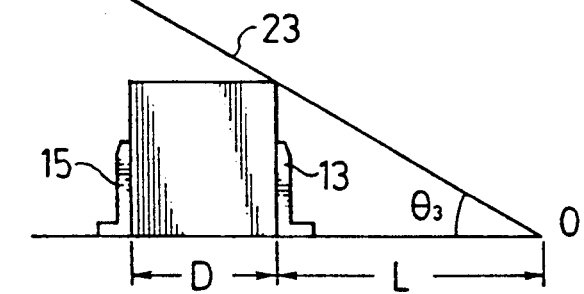

SQUARE WORKPIECE $$\theta = \tan^{-1}\frac{D}{L} \quad ----(3)$$

LENGTH OF ONE SIDE D

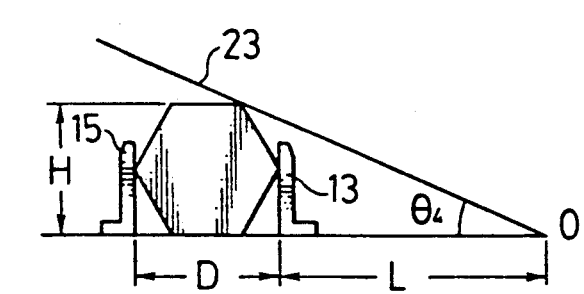

HEXAGONAL WORKPICE $$\theta = \tan^{-1}\frac{2\sqrt{3}D}{4L+D} \quad ---(4)$$

HIGHT $H=\frac{\sqrt{3}}{2}D$

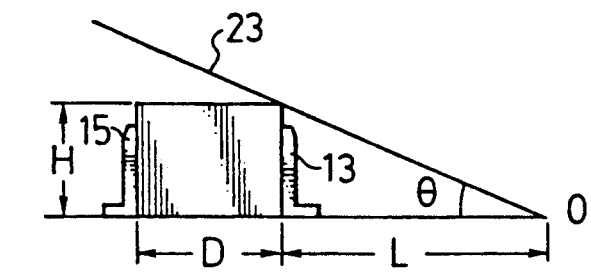

RECTANGULAR WORKPIECE $$\theta = \tan^{-1}\frac{H}{L} \quad ----(5)$$

$$H = L\tan\theta \quad ----(6)$$

HIGHT

DEVICE FOR MEASUREMENT OF WORKPIECE DIMENSIONS AND CONFORMING AUTOMATIC ADJUSTMENT OF BANDSAW BLADE GUIDE

This is a divisional of co-pending application Ser. No. 07/352,889 filed on May 17, 1989, and now abandoned.

BACKGROUND OF THE INVENTION

1. Field of the Invention

The present invention relates to a bandsaw machine provided with an endless bandsaw blade, and, in particular, to a device for measuring the cross sectional shape and dimensions of a workpiece being cut in the bandsaw machine, and a device for automatically adjusting the position of a saw blade guide which guides the saw blade to conform to the shape and dimensions of the workpiece.

2. Description of the Prior Art

When a material is being cut by a bandsaw blade, it is desirable to uniformly control the cutting rate (surface area cut per unit time) or to know in advance the shape and dimensions of the workpiece in order to adjust the position of a saw blade guide which guides the sawblade on both sides of the workpiece.

Conventionally, the operator generally uses a scale to measure the shape and dimensions of the workpiece. Devices have been proposed to make such measurements automatically, such as the device with the configuration outlined in U.S. Pat. No. 4,432,260. In the abovementioned prior art, when the workpiece is secured in a vise device the width of the workpiece is measured using a scale means connected to the vise device, and the height of the workpiece is measured using a scale means in the vertical direction.

Accordingly, it is possible to measure the width and the height of the workpiece automatically. However, there is no facility for judging if the shape is square or circular, and therefore the judgment of the shape of the workpiece is dependent on the observations of the operator.

In recent years, the need has arisen for a device to automatically convey a workpiece into the sawing machine to allow the cutting of many different types of workpieces automatically. This requires automatic measurement of the shape and dimensions of the workpiece in the sawing machine.

In addition, it is desirable to be able to reduce the distortion and the vibration of the band saw blade of a band saw machine when it is cutting into the workpiece.

Regardless of the type—horizontal or vertical—for a band saw machine it is normal to provide a saw blade guide for guiding the saw blade on each side of the workpiece. Conventionally, one of these saw blade guides is set in a fixed position while the other is usually adjusted beforehand to a position conforming to the maximum length of cut in the workpiece. Accordingly, when, for example, the workpiece is a round rod, the spacing of the saw blade guide is set large enough to conform to the diameter of the round rod. For this reason, when the saw blade first contacts and begins to cut into the round rod, the length of cut in the round rod is extremely short with respect to the dimensions of the spacing of the blade guides on each side of the saw blade. Therefore, not only is the band saw blade easily twisted and bent, but severe vibration of the saw blade can also be produced.

Specifically, in a conventional band saw machine the adjustment of the position of the saw blade guides must be performed manually. The problem therefore arises that, not only is the adjustment of the blade guide position a great deal of trouble, but bending of the saw blade readily occurs at the first cut.

In consideration of the problems associated with such conventional devices, technology has been developed to automatically adjust the spacing of the saw blade guides to conform to changes in the length of the cut in the workpiece. Specifically, such technology is disclosed, for example, in U.S. Pat. No. 4,363,254. This prior art incorporates a configuration in which one of the saw blade guides is moved by means of a hydraulic cylinder which is controlled by a changeover valve, and the changeover valve is controlled by means of a profiling contact member which is moved by the workpiece.

Accordingly, in this prior art, as the saw blade advances to cut into the workpiece, the contact member must smoothly profile the workpiece, and this requirement limits the shape of the workpiece. Specifically, cutting a workpiece with a complicated shape, for example, shape steel or a plurality of rod-shaped workpieces in bundles, is difficult to implement.

SUMMARY OF THE INVENTION

A first object of the present invention is to provide, with due consideration to the drawbacks of such conventional devices, a device and method by which it is possible to automatically determine whether the cross sectional shape of a workpiece which is to be cut by a sawing machine is circular or square, and to automatically measure its dimensions.

A second object of the present invention is to provide a device and method by which it is possible to automatically determine the cross sectional shape of a workpiece which is to be cut by a sawing machine, not only when it is circular or square, but also in the case of other shapes, and to automatically measure its dimensions.

A third object of the present invention is to provide a device to automatically adjust the spacing of a pair of saw blade guides to correspond to the length of cut in a workpiece, regardless of the cross sectional shape of the workpiece.

These objects are achieved in the present invention by the provision of a means by which it is possible to estimate the cross sectional shape of the workpiece and to measure its dimensions, basically, by detecting the width of the workpiece, the contact angle or the contact position when the saw blade contacts the workpiece, and the presence or absence of a workpiece vertical side surface. In addition, if the cross sectional shape and dimensions of the workpiece are already known, the positional relationship of the band saw blade and the workpiece can be calculated by detecting the position of the band saw blade. Further, the positional relationship of the workpiece and the saw blade guides can be calculated so that the saw blade guides are controlled to maintain a position in which they do not obstruct the workpiece.

BRIEF DESCRIPTION OF THE DRAWINGS

These and other objects, features, and advantages of the present invention will become more apparent from the following description of the preferred embodiments taken in conjunction with the accompanying drawings, in which:

FIG. 4 is an explanatory drawing which shows the relationship between the width D and the contact angle $\theta n$ for round, triangular, square, hexagonal, and rectangular workpieces.

DETAILED DESCRIPTION OF THE PREFERRED EMBODIMENTS

Now referring to FIG. 1 and FIG. 2, the complete configuration of a band saw machine including the device of the present invention will be explained.

Figure 1:
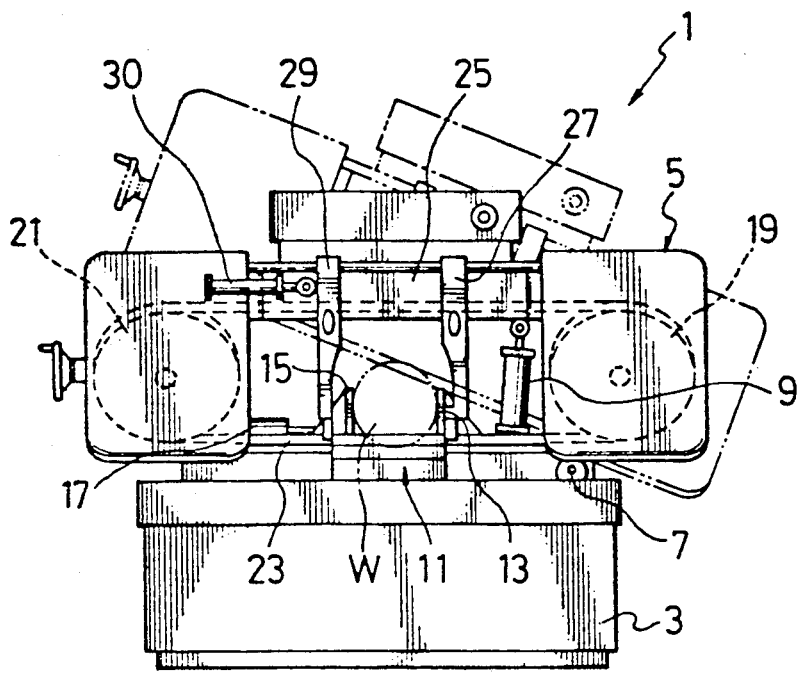
FIG. 1 is an elevation drawing showing the complete configuration of a band saw machine.
Figure 2:
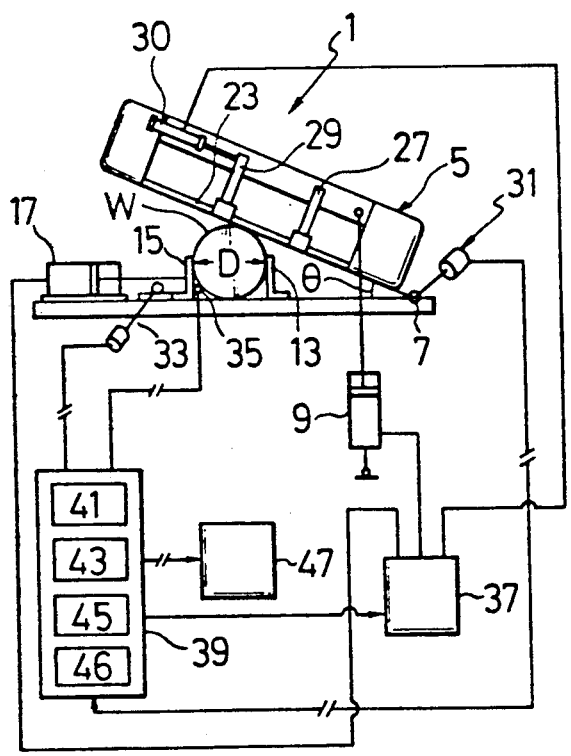
FIG. 2 is a block diagram of an embodiment of the device of the present invention.

As shown in FIG. 1, on a machine stand 3 of a band saw machine 1, as is generally known, a saw blade housing 5 rotates around a shaft 7, and is installed in a freely rotatable manner in the vertical direction by means of an elevating cylinder 9. In addition, a vise device 11 is provided on the machine stand 3 and a workpiece W is interposedly secured between a fixed vise jaw 13 and a movable vise jaw 15. The movable vise jaw 15 can be freely moved in the lateral direction by a transfer cylinder 17.

As is generally known, a driving wheel 19 and a follower wheel 21 are bearingly supported in a freely rotatable manner in the saw blade housing 5 and an endless loop-shaped saw blade 23 runs on the wheels 19, 21. In the center section of the saw blade housing, a guide member 25 is provided, extending laterally. A pair of guide brackets (saw blade guides) 27, 29 are provided in a freely positional adjustable manner to guide the saw blade 23 parallel to the guide member 25, and a saw blade guide transfer cylinder 30 is provided which moves and positions the movable guide bracket 29 corresponding to the shape and dimensions of the workpiece W.

Next, a specific structure for measuring the shape and dimensions of the workpiece W in a sawing machine with a configuration of the type outlined above will be explained. As shown in FIG. 2, a contact angle detector 31 is provided on the rotating shaft 7 of the saw blade housing 5 to measure the angle of rotation $\theta$ or the position of the saw blade 23. The contact angle detector 31 can be, for example, a rotary encoder or the like which is linked to the rotation of the saw blade housing 5 and detects the angle of rotation $\theta$ or the position of the saw blade 23. Further, the detection of whether or not the saw blade 23 has contacted the workpiece W can be accomplished by a device which detects the passage of electricity between the saw blade 23 and the workpiece W, or by a device which defect the load on the drive motor of the saw blade 23.

In addition, a width detector 33 and a vertical surface detector 35 are provided on the movable vise jaw 15 for detecting the width of the workpiece W and for detecting the existence of a vertical surface on the cross sectional corner section of the workpiece W respectively. The width detector 33 comprises a rack which moves together with the movable vise jaw 15 and a rotary encoder fitted with a pinion which engages the rack, or the like.

Figure 3:
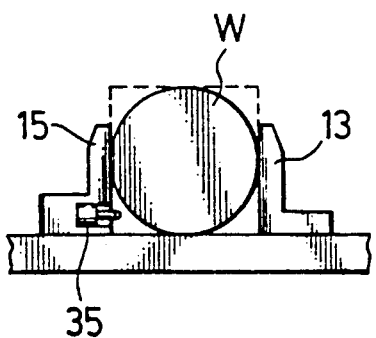
FIG. 3 is an explanatory drawing of an example of a vertical surface detector.

The vertical surface detector 35, as shown in FIG. 3, comprises a microswitch provided at the lower part of the movable vise jaw 15. The actuator of the microswitch normally projects slightly from the inner clamping surface, and when a square bar or other straight sided material is fed into the vise device 11, the actuator retreats and outputs a signal showing that a right angled section is present on the workpiece.

A hydraulic pressure control device 37 is connected to a hydraulic pump (omitted from the drawings) and a variety of changeover valves (omitted from the drawings) for feeding and discharging hydraulic fluid to the elevating cylinder 9 for the housing 5, the transfer cylinder 17 for the movable vise jaw 15, and the saw blade guide transfer cylinder 30.

A calculation device 39 which calculates the dimensions and estimates the shape of the workpiece W is provided with a control section 46 for controlling a memory section 41, a calculation section 43, a judgment section 45, and the hydraulic pressure control device 37. The memory section 41 stores the contact angle $\theta n$ (where $n = 1, 2, 3, 4$) as a mathematical function of the D, as shown in the equations (1) to (4), On ($n = 1, 2, 3, 4$) being for round, triangular, square, hexagonal, and rectangular workpieces, as shown in FIG. 4. Here, D is the width of the workpiece, L is the distance between the inner clamping surface of the fixed vise jaw 13 and the center of rotation O of the saw blade. The calculation section 43 performs the required calculations based on the signals from the various detectors. The judgment section 45 compares the calculated value with the detected value and estimates the shape of the workpiece. The control section 46 controls the position of the saw blade guide from the estimation of the shape and dimensions of the workpiece W and controls the hydraulic pressure control device 37. A display section 47 displays the shape and dimensions of the workpiece W based on the signal from the calculation device 39.

Figure 5:
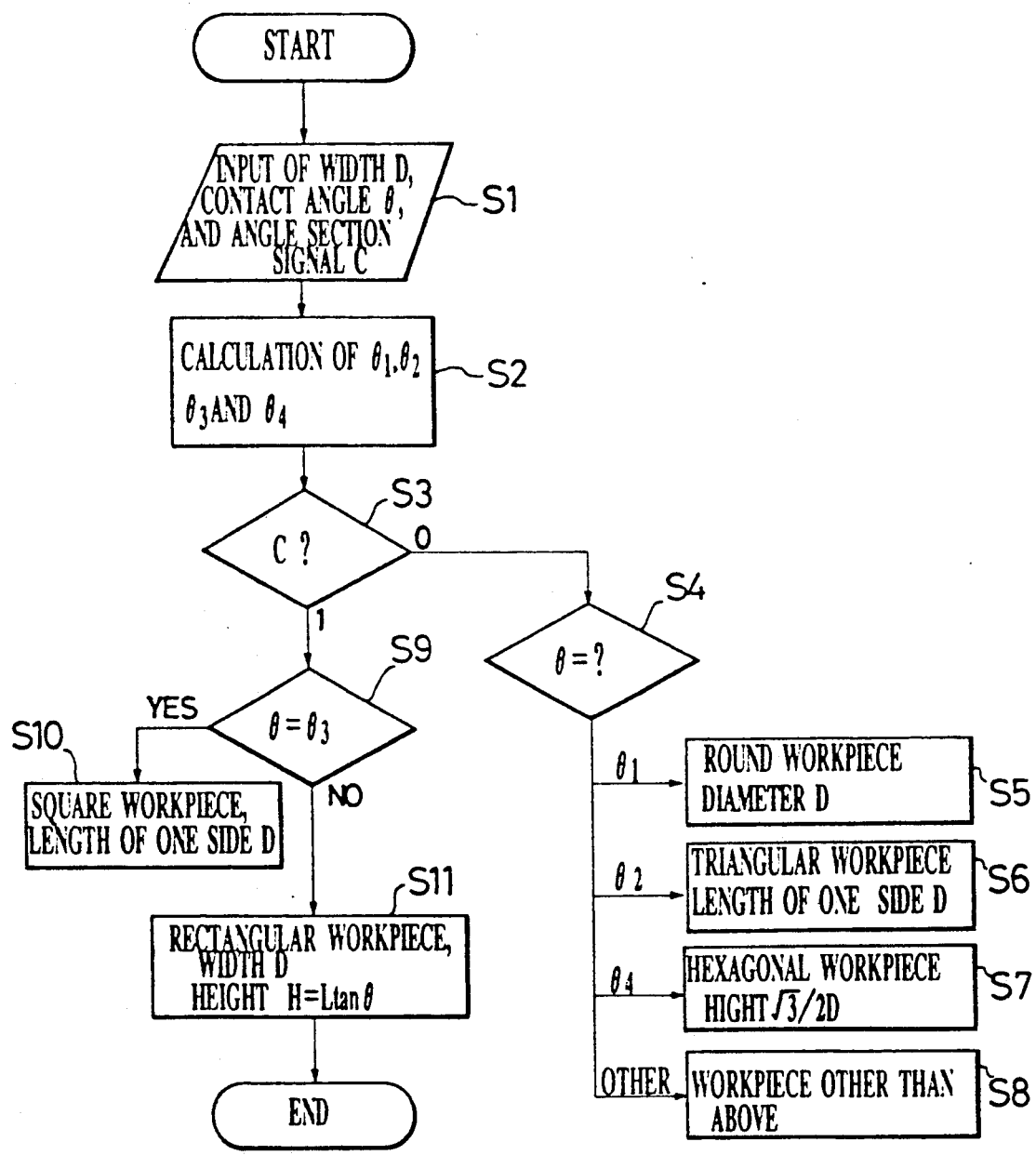
FIG. 5 is a flow chart showing the measurement method using the device, of the present invention.

Next, the method of measuring the shape and dimensions of the workpiece W using the device of the present invention will be explained with reference to the flow chart of FIG. 5. First, in Step $S_1$ the width D of the workpiece W from the width detector 33, the contact angle $\theta$ from the detector 31 when the saw blade 23 contacts the workpiece, and an angle section presence signal C from the vertical surface detector 35 (where $C = 1$ for square and rectangular materials for instance, and $C = 0$ for all other materials which have no angle section) are introduced to the calculation device 39. Next, in Step $S_2$ the contact angles $\theta n$ ($n = 1, \ldots, 4$) for workpieces of various shapes are calculated, based on the workpiece width D.

In Step S3 the judgment is made as to whether the angle section signal C is 1 or 0. When the cross section of the workpiece has no vertical angle section, i.e. C=0, in Step S4, a comparison is made of the input value $\theta$ of the contact angle and the contact angles $\theta_1$, $\theta_2$, $\theta_4$, calculated in Step S2. When the input value $\theta$ and the calculated value $\theta_1$ are equal, in Step S5 the workpiece is judged to be round, and the diameter of the workpiece is indicated as D. When the input value $\theta$ and the calculated value $\theta_2$ are equal, in Step S6 the workpiece is judged to be triangular, and one side of the workpiece is indicated as D. When the input value $\theta$ and the calculated value $\theta_4$ are equal, in Step S7 the workpiece is judged to be hexagonal and the distance between opposite sides of the workpiece or the height is indicated as $\sqrt{3}/2$D.

When the input value $\theta$ is not equal to any of the calculated values for $\theta_1$, $\theta_2$, $\theta_4$, in Step S8 the workpiece is judged to be a shape other than round, triangular, hexagonal, or rectangular and an indication is made to that effect.

If in Step S3 the angle section signal C is 1, then the workpiece W is square or rectangular, and in Step S9 the input value of the contact angle $\theta$ is compared with the calculated value $\theta_3$. When the input value $\theta$ and the calculated value $\theta_3$ are equal, in Step S10 the workpiece is judged to be square and one side is indicated as D. When the input value $\theta$ and the calculated value $\theta_3$ are not equal, in Step S11 the workpiece is judged to be rectangular and the width D and height H are indicated (H is calculated from Equation (6) in FIG. 4).

When the shape and dimensions of the workpiece W are estimated in the above manner, the saw blade guide transfer cylinder 30 is controlled through the hydraulic pressure control device 37 by a control signal from the control section 46, and the guide bracket 29 is positioned to correspond to the abovementioned shape and dimensions.

The shape of the workpiece W measured by the device of the present invention is not limited to the shapes given above as examples. If there is a uniform functional [relationship between the width D and the contact angle $\theta$ the shape of the workpiece can be measured by the above method.

In the case where the largest number of workpiecese subjected to the cutting process are round or square only, it is possible to implement a mode in which the saw blade housing is elevated perpendicularly following a guide post. In this case, it can easily be determined whether the workpiece is round or square, by the detection of the width D of the workpiece and the detection of the angle section (detection of the presence or absence of a vertical surface) using the vertical surface detector 35, and the detection of the height of the position at which the saw blade contacted the workpiece; also the dimensions of the workpiece are obtained from such detections.

Figure 6:
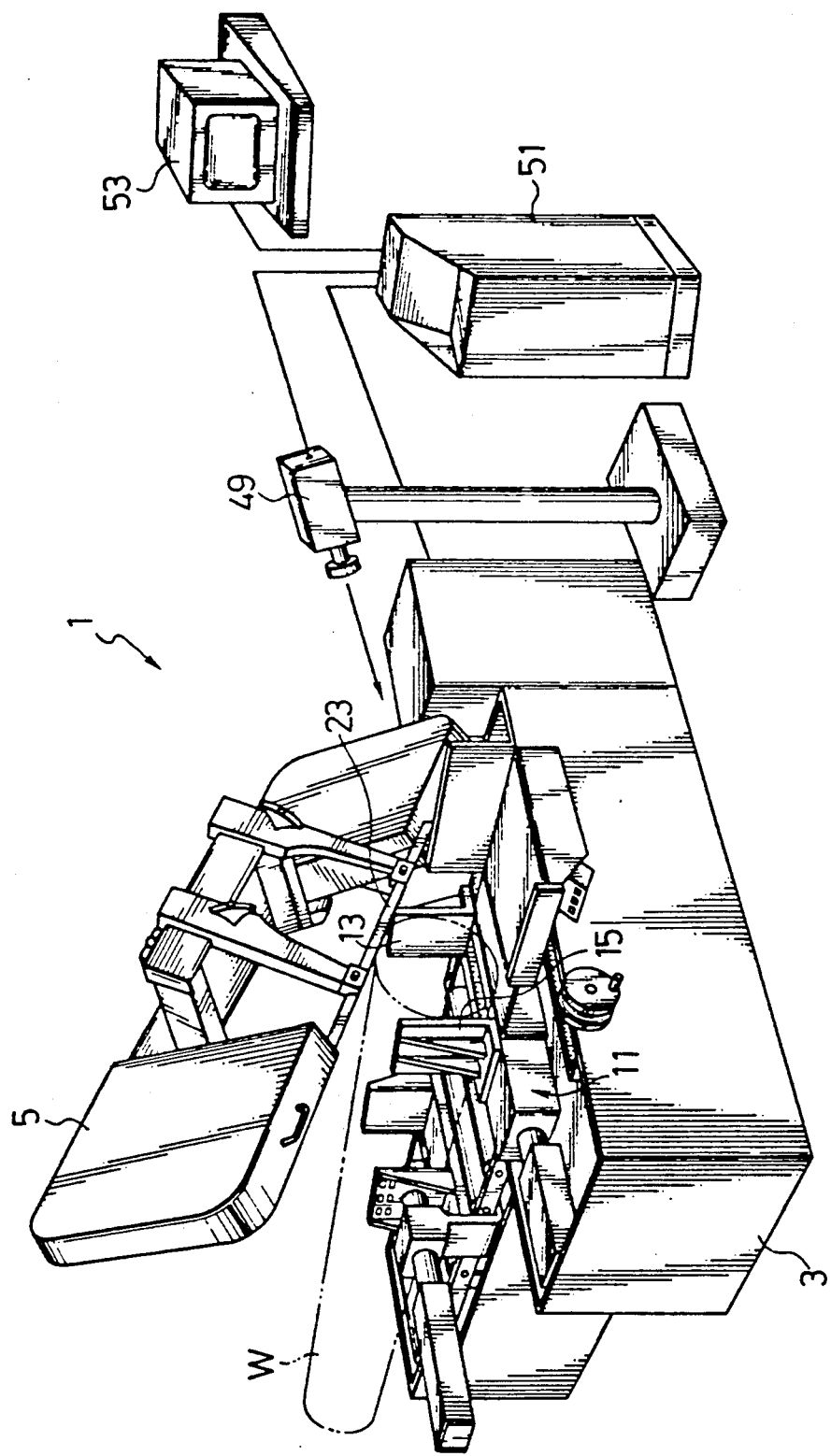
FIG. 6 is a perspective drawing exemplifying the case where a CCD camera is used to measure the shape and dimensions of the workpiece.

Furthermore, it is possible to have a configuration by which the cross sectional shape and the dimensions of the workpiece are measured, for example, as shown in FIG. 6, by a solid state photographic device 49 such as a CCD camera positioned at the front of the band saw machine 1 where it does not interfere with the operation.

In such a configuration, it is possible to determine the shape and dimensions of the workpiece W by processing the image data for the workpiece W which is photographed by the solid state photographic device 49, using an image processing device 51. The operator can confirm the shape and dimensions of the workpiece W by displaying the results of the image processing on a display device 53.

When meassuring the shape and dimensions of the workpiece W using the solid state photographic device 49, the photography can be carried out during the cutting of the workpiece W. It is also possible to detect the position at which the saw blade 23 cuts into the workpiece.

As can be understood from the above explanation, the shapes of a wide variety of workpieces fed to the sawing machine can be determined by means of the abovementioned embodiment and the dimensions can be measured and displayed. Accordingly, it is possible to automate the operation of the sawing machine very easily, and an erroneous sawing operation can be prevented by a warning or the like when a workpiece which does not conform to the specifications is fed to the process.

In addition, the saw blade guide can be positioned automatically to conform to the shape and dimensions of the workpiece. This results in the most suitable positioning.

In the previously outlined embodiment, only the saw blade guide 29 of the saw blade guides 27, 29 is moved by the cylinder 30. However, it is possible to have a configuration by which it is possible to move the sawblade guides 27, 29 together or individually, and to control the position of each. With such a configuration it is possible to automatically adjust the spacing between the saw blade guides 27, 29 to the most suitable spacing to conform to the shape and legnth of cut in the workpiece so that bending and vibration can be suppressed both at the beginning of and during the cutting of the workpiece by the band saw blade 23.

Figure 7:
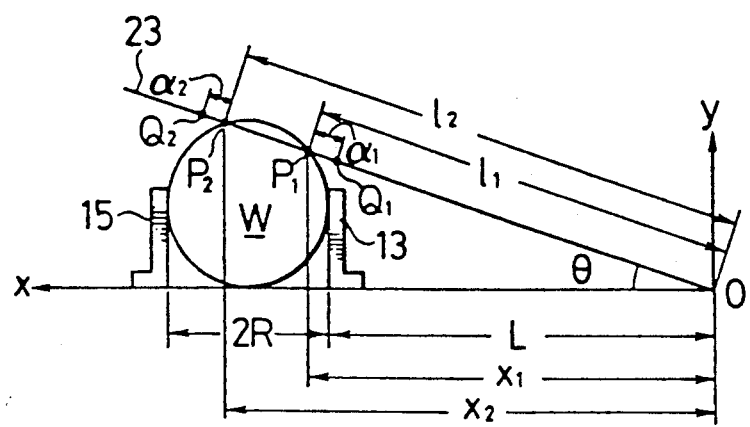
FIG. 7 is an explanatory drawing showing the change in the length of cut from the change in positional relationship between the workpiece and the saw blade.

Now, in adjusting the spacing of the saw blade guides 27, 29 to conform to the shape and length of cut in the workpiece, it is preferable to detect and calculate any changes in the positional relationship between the workpiece W and the band saw blade 23. That is to say, by using these data, the spacing of the saw blade guides 27, 29 can be optimally adjusted in accordance with the change of the length of cut of the workpiece, which changes with the feeding of the housings. When the workpiece W is, for example, a round material as shown in FIG. 7 it is possible to calculate what the next length of cut will be.

Specifically, if the diameter of the workpiece is 2R, the distance between the origin 0 and the clamping surface of the fixed vise jaw 13, L, and the angle of inclination of the saw blade $\theta$, then the positions $P_1$, $P_2$ at which both ends of the length of cut are located are obtained as the point of intersection of the circle represented by an equation, $(x-R-L)^2+(y-R)^2=R^2$, and the straight line of the inclined angle $\theta$, $y=x \tan \theta$.

If the distances from the origin 0 to the points $P_1$ and $P_2$ are written as $l_1$, $l_2$, then:

$$l_1 = (R + L + R\tan\theta - \sqrt{(R + LR\tan\theta)^2 - \sec^2\theta(R + L)^2\cos\theta}$$

$$l_2 = (R + L + R\tan\theta + \sqrt{(R + LR\tan\theta)^2 - \sec^2\theta(R + L)^2\cos\theta}$$

which are functions of $\theta$.

The positions $Q_1, Q_2$, of the saw blade guides 27, 29 are suitably set to avoid interference with the workpiece W at distances of values $a_1, a_2$ respectively from the positions $P_1, P_2$. Specifically, the position $Q_1$ is $(l_1-a_1)$, and position $Q_2$ is $(l_2+a_2)$. Then, for the greatest length of cut, the saw blade guides 27, 29 are located at positions $\theta_r$ (r=1, 2) where $\theta r = \tan^{-1}$ (R/ R+L); the saw blade guides 27, 29 are maximally moved to this position.

Figure 8:
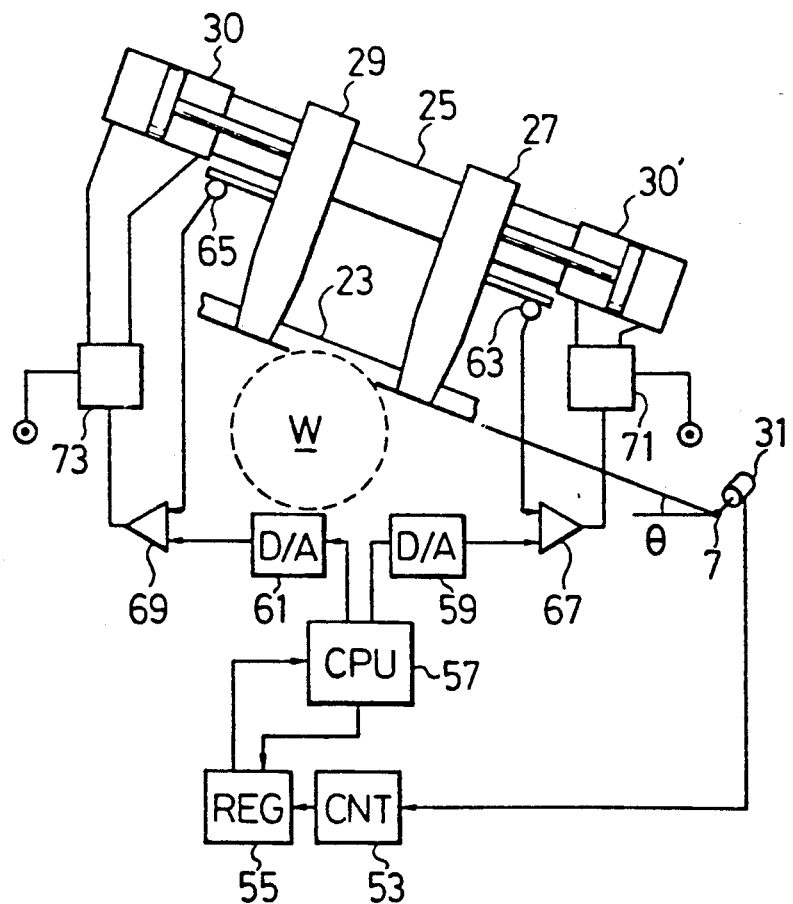
FIG. 8 is a block diagram showing the configuration of a device for adjusting the movement of the saw blade guides.

Next, an adjustment device which moves and adjusts the saw blade guides 27, 29 corresponding to the length of cut will be explained with reference to FIG. 8. This device comprises a rotary encoder 31 which detects the saw blade position and is mounted on the hinge pin 7; a counter 53 which counts the pulses output from the rotary encoder 31; a register 55 in which the value of the count in the counter 53 is temporarily stored in accordance with instruction pulses output at fixed intervals from a later-described calculation device; a calculation device 57 (hereinafter referred to as the CPU 57) which calculates and sets the respective saw blade positions from the values input to the register 55, using a predetermined equation; a pair of D/A conversion devices 59, 61 which convert the digital values output from the CPU 57 to analog values; a pair of potentiometers 63, 65 as detection devices which detect the current positions of the saw blade guides 27, 29; a pair of differential amplifiers 67, 69 which amplify the difference between the current values of the potentiometers 63, 65 and the set values converted to analog in the D/A conversion devices 59, 61; a pair of hydraulic servo valves 71, 73 which are activated by the output from the differential amplifiers 67, 69; and a pair of hydraulic cylinders 30, 30' which move the saw blade guides 27, 29 along the guide member 25, controlled by the hydraulic servo valves 71, 73.

As a result of this configuration, the saw blade position $\theta$ is detected as a number of pulses from the rotary encoder 31 which are counted by the counter 53. The value of the count is transferred to the register 55 in accordance with an instruction pulse signal output from the CPU 57 at fixed intervals. The CPU 57 takes in the count and calculates the desired positions of the saw blade guides 27, 29 from the previously mentioned equation. The output is converted from digital to analog and is fed to the differential amplifiers 67, 69 along with the signals from the potentiometers 63, 65 showing the current position of the saw blade guides 27, 29. The differential amplifiers 67, 69 amplify the voltage differences and feed control signals to the hydraulic servo valves 71, 73. The hydraulic servo valves 71, 73 control the hydraulic cylinders 30, 30' which transfer the saw blade guides 27, 29 and position them at a set position.

Figure 9:
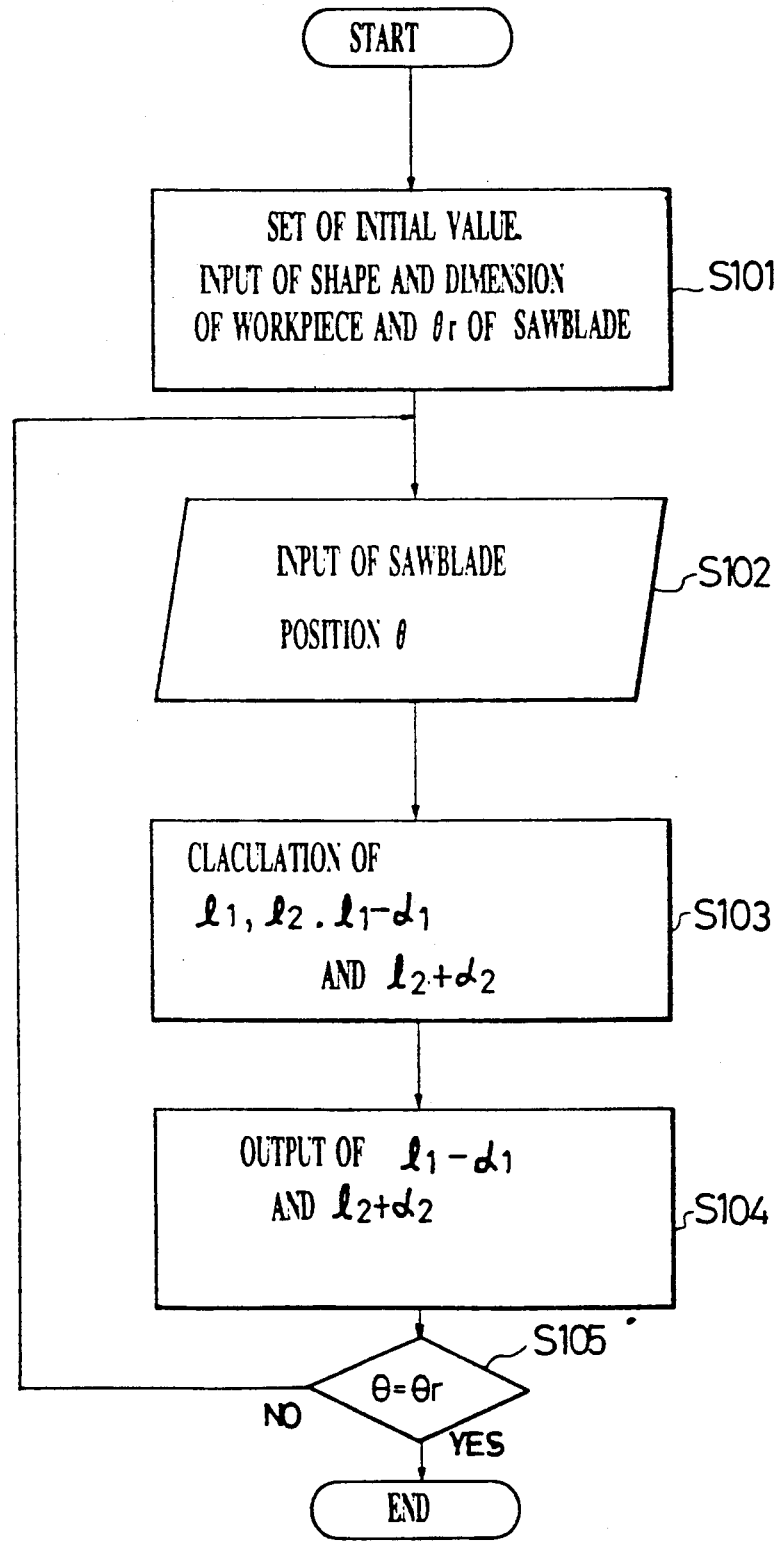
FIG. 9 is a flowchart.

Next, the action of the CPU 57 will be explained in more detail with reference to the flowchart shown in FIG. 9.

In Step $S_{101}$, the initial value is set, and the shape and dimensions of the workpiece W, and the saw blade position $\theta_r$, when the maximum length of cut occurs, are input.

In Step $S_{102}$, the position $\theta$ of the saw blade is detected and input at fixed intervals.

In Step $S_{103}$, the positions $l_1, l_2$ at each end of the length of the cut are calculated based on the equation stored in the memory, and the positions $(l_1-a_1)$ and $(l_2+a_2)$ of the saw blade guides 27, 29 are calculated.

In Step $S_{104}$, the positions $(l_1-a_1)$ and $(l_2+a_2)$ of the saw blade guides 27, 29 are output. The above actions are continued to the position $\theta_r$ which is the position of the saw blade at the maximum length of cut, then, in Step $S_{105}$, the action of the CPU 57 is halted when $\theta=\theta_r$.

Figure 10:
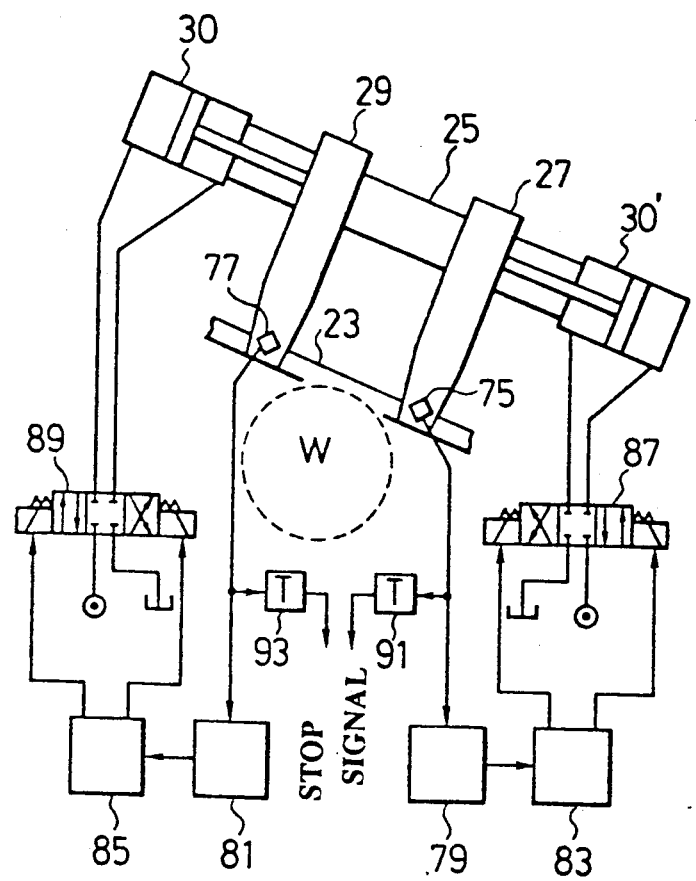
FIG. 10 is a block diagram showing the configuration of a device for adjusting the movement of the saw blade guides.

FIG. 10 shows another embodiment of the device of the present invention. The device of this embodiment comprises a pair of touch sensors 75, 77 as proximity detectors for detecting when the saw blade guides 27, 29 approach the workpiece W; a pair of fixed time operating circuits 79 which operates only for a fixed time period after receiving a signal 81; a pair of solenoid valve controllers 83, 85; a pair of solenoid directional switching valves 87, 89; and a pair of hydraulic cylinders 30, 30'. A pair of protection timers 91, 93 are connected to cut off the power source in case the operation of the touch sensors 75, 77 exceeds a fixed time.

As a result of this configuration, when the touch sensors 75, 79 detect the workpiece W a signal is input to the fixed time operating circuits 79, 81. The fixed time operating circuits 79, 81 energize a pair of solenoids 87a, 89a of the solenoid directional switching valves 87, 89 through the solenoid valve controllers 83, 85 for an optionally set time period only. when the solenoids 87a, 89a are energized, pressurized fluid is fed to the rod side of the hydraulic cylinders 30, 30' and the saw blade guides 27, 29 move away from the workpiece W for the fixed period of time. The touch sensors 75, 77 also move away from the workpiece W and the contact is cut. This action causes a cessation of operation when a cut is being made in the top half of the workpiece W.

Figure 11:
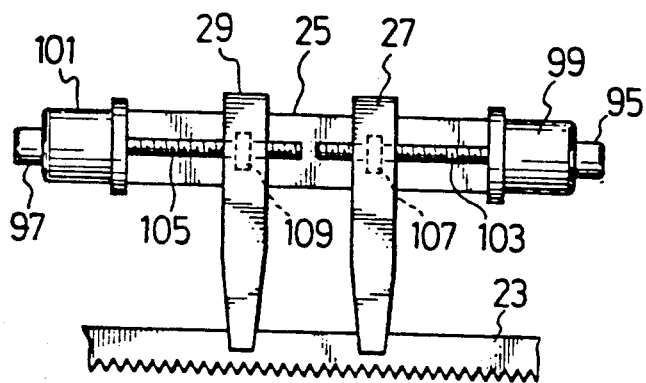
FIG. 11 is a drawing showing the embodiment of a transfer device.

FIG. 11 shows another embodiment of a device which transfers and positions the saw blade guides 27, 29. In this embodiment a pair of screw members 103, 105 are rotated by a pair of servo motors 99, 101 provided with a pair of rotation detectors 95, 97, which can be rotary encoders. A pair of nut members 107, 109 which are engaged by the screw members 103, 105 act to move the saw blade guides 27, 29.

Figure 12:
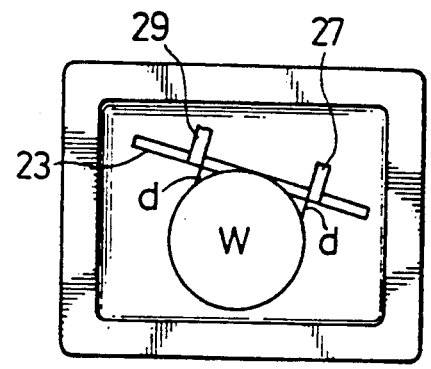
FIG. 12 is an explanatory drawing for the case where a CCD camera is used.

FIG. 12 shows still another embodiment of the present invention. In this embodiment, the workpiece W and the saw blade guidees 27, 29 are photographed by a CCD camera, the image is processed by an image processing device and displayed on a display device. The distance d between the workpiece W and the saw blade guides 27, 29 is calculated. When this distance d is below a set value, the saw blade guides 27, 29 are moved away from the workpiece W. A device comprising the previously mentioned hydraulic cylinders and a screw mechanism rotated by a servo motor can be adopted as the device for moving the saw blade guides 27, 29.

The sawing machine utilizing the device of the present invention is not limited to the horizontal band saw machine given here as an example. A vertical band saw machine provided with a driving wheel and a follower wheel separated vertically can also be used. When a vertical band saw machine is used it is only necessary for the top saw blade guide to be adjusted and positioned vertically.

As can be understood from the explanation of the abovementioned embodiments, because the position of the saw blade guides can be calculated and set, based on the position of the saw blade and the shape of the workpiece, the position of the saw blade guides can be adjusted automatically to correspond to changes in the length of cut in the workpiece, regardless of the shape of the workpiece. Reducing of bending and vibration is therefore possible. In addition, the shape of the cross section of the workpiece can also be determined automatically.

What is claimed is:

1. An automatic adjusting device for adjusting a pair of saw blade guides of a band saw machine comprising:
    a position detector for detecting a present position of a saw blade cut into a workpiece set in the band saw machine, said saw blade position detected independently of said workpiece;
    a device for determining an appropriate position for each saw blade guide based on said present position of the saw blade and known shape and dimensions of the workpiece;
    a pair of transfer devices which move and position said pair of saw blade guides respectively for obtaining an appropriate span between said pair of saw blade guides.

2. An automatic adjusting device for adjusting a pair of saw blade guides of a band saw machine comprising:
    a pair of proximity detectors for sensing an approach of said saw blade guides to a workpiece within a set value;
    at least one circuit which is activated by said proximity detectors for a predetermined fixed time;
    a pair of transfer devices which move and position said pair of saw blade guides respectively along a guide bar for said fixed time for obtaining an appropriate span between said saw blade guides.

* * * * *